May 17, 1932. G. W. CRABTREE 1,858,916
CONTROLLING DEVICE FOR LAMINATED VEHICLE SPRINGS
Filed Nov. 19, 1928 2 Sheets-Sheet 1
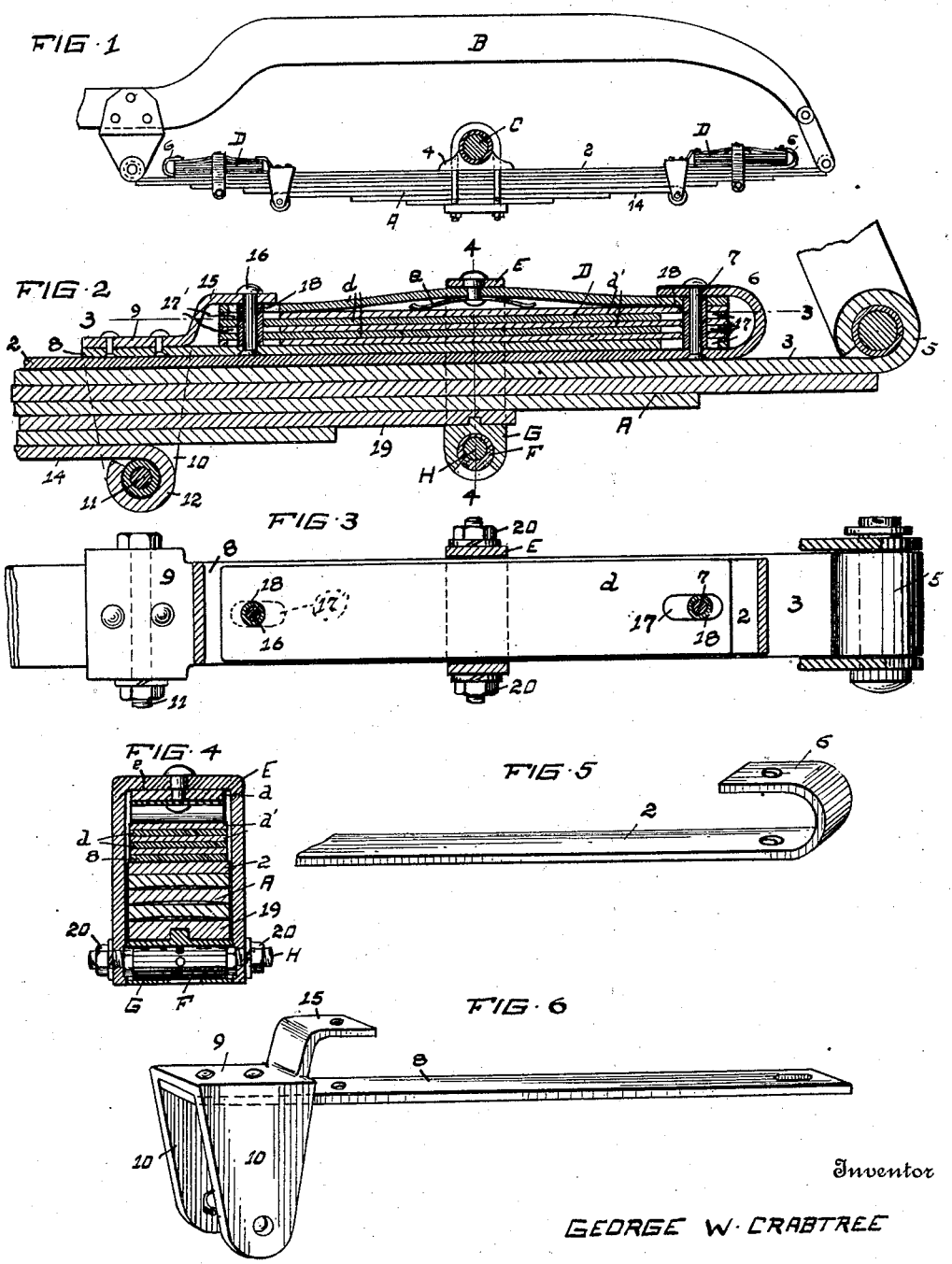
Inventor
GEORGE W. CRABTREE
By Fisher, Moser & Moore
Attorney May 17, 1932. G. W. CRABTREE 1,858,916
CONTROLLING DEVICE FOR LAMINATED VEHICLE SPRINGS
Filed Nov. 19, 1928 2 Sheets-Sheet 2

Inventor
GEORGE W. CRABTREE
By Fisher, Moser & Moore.
Attorney

Patented May 17, 1932

1,858,916

UNITED STATES PATENT OFFICE

GEORGE W. CRABTREE, OF CLEVELAND HEIGHTS, OHIO

CONTROLLING DEVICE FOR LAMINATED VEHICLE SPRINGS

Application filed November 19, 1928. Serial No. 320,253.

My invention relates to a controlling attachment for laminated vehicle springs, and the main purpose of the device is to frictionally control the flexing movements of the spring, both upwardly and downwardly; to augment the power of the spring to support the load; and to check the recoil movements of the spring and rebound of the vehicle body. Thus the device provides a frictional clamping pressure between the leaves of the main spring and also between one or more sets of supplemental leaves superposed or attached to the spring. The laminated main spring is shackled to the vehicle body or frame in the usual way, and the supplemental leaves for controlling the main spring are attached directly to the spring without tying the vehicle body to the axle with a strap, rod or similar connection. The set or sets of supplemental leaves are also so connected and arranged that relative movement may be effected in substantial degree between them when the leaves of the main spring are flexed in either direction, thereby frictionally controlling the action of the main spring, all as herein shown and described and more concisely pointed out in the claims.

In the accompanying drawings, Fig. 1 is a side elevation of a part of a vehicle chassis frame and a main spring equipped with my improvement. Fig. 2 is a sectional view of one end of the main spring and its attachment on an enlarged scale. Fig. 3 is a plan view and horizontal section on line 3—3 of Fig. 2. Fig. 4 is a section transversely on line 4—4 of Fig. 2. Fig. 5 is a perspective view of the upper leaf of the main spring.

Figure 7:
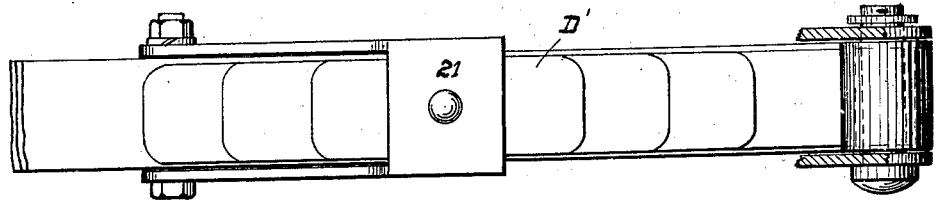
Figure 8:
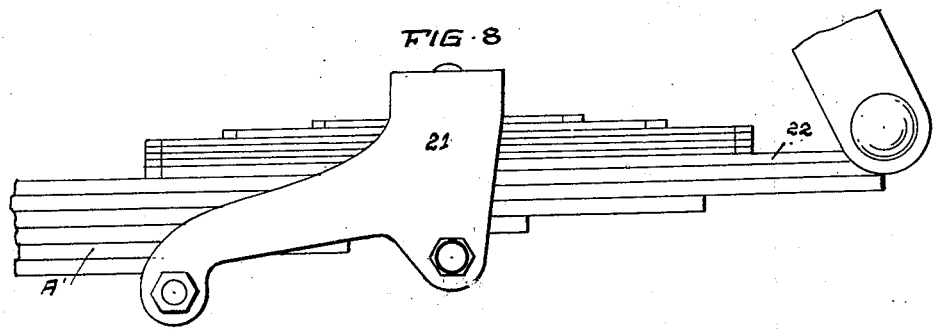
Figure 9:
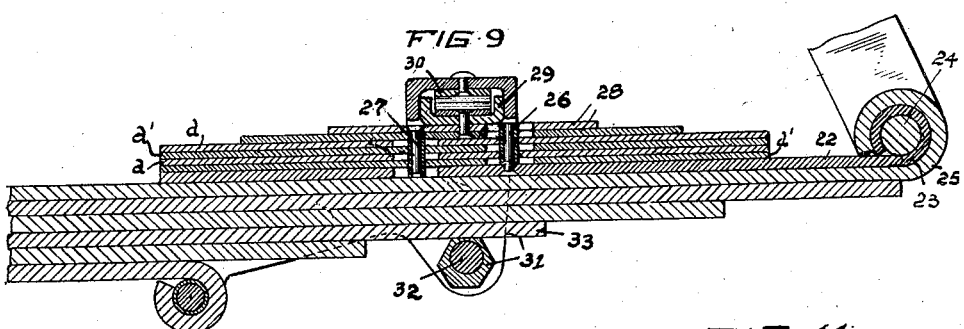
Figure 11:
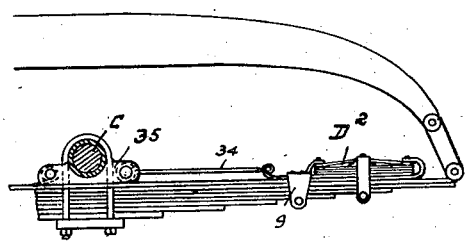
Figure 10:
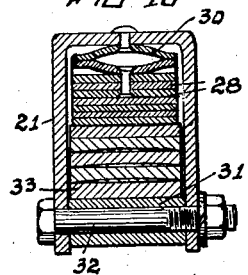
Figure 12:
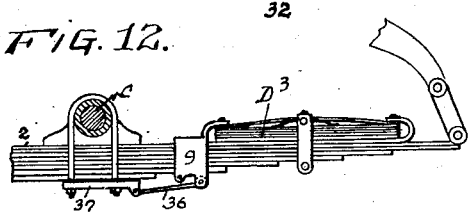

Fig. 6 is a perspective view of the bottom leaf and yoke member of the attachment device. Figs. 7 to 10, inclusive, illustrate a modification, Fig. 7 being a plan view, Fig. 8 a side elevation, Fig. 9 a sectional view, Fig. 10 a cross section of the spring and its attachment. Fig. 11 is a side view of another form of the invention, and Fig. 12 is a similar view of a further modification.

Referring now to Figs. 1 to 6, inclusive, the main spring A delineated therein is a cambered laminated spring shackled at its opposite ends in a common or known way to an arched side member B of a chassis frame or vehicle body. The spring is also secured to an axle C, and may be assumed to be flattened out under a partial load, in the absence of a showing of the vehicle body. However, the spring may be more or less arched and of different shape, type or kind, than as shown, that is, it might be quarter, semi-elliptic, three-quarter or full elliptic. The number of laminations or leaves may also vary, but the leaves differ in length and overlap successively as customary, whereby the shackled ends may flex more freely than the middle portion of the spring. Superposed upon each free flexible end of the main spring is a controlling device D composed of a set of supplemental leaves or spring plates. Only one controlling device D would be employed in a one-quarter elliptic spring, but in a half-elliptical spring, such as shown in the drawings, I prefer to use two controlling devices, one for each free end of the main spring. These supplemental leaves or plates of the controlling devices may be connected in different ways to each other and the main spring to permit them to function in the way hereinafter described. But as shown on sheet 1 of the drawings, a single relatively long leaf 2 is seated upon the main top leaf 3 of the main spring, to which it is rigidly secured at its middle by the axle clip or clevis 4 for the main spring. Leaf 3 is provided with loops or eyes 5 as customarily to permit a shackle connection to be made with side member B. Supplemental leaf 2 is somewhat shorter than leaf 3, and preferably thinner and more flexible than leaf 3 and the other leaves of the main spring. Leaf 2 being shorter than leaf 3 the opposite extremities 6 thereof may be bent upwardly and reverted or projected for a short distance toward the axle to facilitate attachment of a series of short supplemental leaves or plates thereto. Inasmuch as both ends are constructed and equipped alike, reference will be made hereafter to only one end of the main spring, and like characters or numerals will be used to designate like parts at opposite ends of the main spring.

Thus, in Fig. 2, I show a controlling device D embodying six supplemental leaves d—d', including a bottom plate 8 which rests flat upon and extends longitudinally of the controlling leaf 2. A yoke member 9 is riveted to or otherwise secured to the inner end of plate 8, and the depending side pieces or legs 10 of this yoke member overlap the sides of the leaves of the main spring and are connected by a bolt or rivet 11 to a loop or eye 12 formed at the outer end of one of the intermediate leaves of the main spring, for example, leaf 14 thereof. Yoke 9 includes an angular projection or extension 15 adapted to overlap the inner ends of the supplemental leaves d—d', whereby a bolt or rivet 16 may be employed to connect all the supplemental leaves or plates d—d' at one end to yoke 9 and plate 8, which yoke 9 is connected in turn to one of the lower and shorter leaves of the main spring. However, the connections for the supplemental leaves d—d' are so arranged that longitudinal movement may be effected relatively between them. For that purpose, a given number of the leaves (d) are immovably fixed at their corresponding ends to yoke 9 and plate 8, and their opposite ends are provided with slots 17 to permit longitudinal movement of such leaves d in respect to the intervening leaves d' and the rivet or bolt 7 which extends through the reverted portion 6 of controlling leaf 2. The series of leaves d' are interposed between the leaves d and plate 8, and rivet 7 secures this series or set of leaves d' at their outer ends immovably to controlling leaf 2. The opposite ends of leaves d' are provided with slots 17' to permit bolt 16 to extend through them. Spacing bushings 18 may also be used with the rivets 7 and 16, respectively. Recapitulating, in brief, there are two sets of supplemental leaves, d and d', which are arranged to slide in opposite directions in frictional contact with each other, when the main spring is flexed either upwardly or downwardly from a neutral or normal position. The two sets of supplemental leaves are shifted in opposite directions in substantial degree by connecting one set to one of the lower and shorter leaves of the main spring A, for example leaf 14, or to a member connected to the axle assembly at the bottom of the main spring A, and the other set to one of the longer leaves of the main spring or to another part fixed to the axle or vehicle frame, for example, leaf 2 or its equivalent. Inasmuch as the main spring is laminated and rigidly secured to axle C or some other part of the vehicle it follows that flexure of the spring will produce relative movement longitudinally between the superposed leaves thereof, and the greatest relative movement occurs between the spring leaves which are spaced the farthest apart. Accordingly, a substantial degree of longitudinal movement occurs relatively between two leaves which are separated by two or more intermediate leaves, for example, leaves 2 and 14 of the main spring, which are separated by five leaves as shown in Fig. 2. Thus the longitudinal movement of the leaves may be slight as between two engaging leaves, but increasingly greater between any two which are separated by other leaves or spaced apart to lie in different planes or at different elevations where clipped to axle C. Therefore, by connecting a set of supplemental leaves or plates to one of the leaves on one side of the main spring, and connecting or anchoring an additional set to another leaf or member on the opposite side of the same main spring, especially a leaf or member remotely located from the first, I am enabled to slide the two sets of supplemental leaves a substantial distance upon each other so that a marked snubbing or frictional action may be obtained to directly govern or control the main spring at its more elastic or flexible portion.

Thus, in Fig. 2 I show a saddle E which straddles and embraces both the supplemental leaves d and d' and four leaves of the main spring. Saddle E is riveted loosely or otherwise secured to the middle of upper leaf d, which in this instance is cambered or bowed upwardly, so that this leaf d may be utilized as a compression spring to press downwardly at its opposite ends upon the other supplemental leaves d and d'. I also show a short bowed spring e interposed between upper leaf d and the adjacent leaf d', whereby a downward pressure will also be applied centrally between the ends of the supplemental springs. A predetermined tension on the supplemental leaves is obtained by adjusting an eccentric F within a shoe G which is carried between the lower extremities of saddle E and which bears against the bottom face of one of the leaves of the main spring, leaf 19 for example. A bolt H connects the legs of the saddle, passing through the eccentric and the shoe, and rotary adjustment of the eccentric may be effected when the lock-nuts 20 on the outer ends of the bolt are released or loosened. The saddle, shoe, and eccentric exemplify one form of clamping device which may be used to clamp the leaves of the main spring and the leaves of the supplemental spring tightly in frictional contact, but I do not wish to limit myself to the exact form and construction of clamping means shown, inasmuch as the same results may be produced in various ways. Nor do I limit myself to the exact construction of supplemental springs and means for connecting them to the leaves of the main spring, as shown in Figs. 1 to 6.

Thus, in Figs. 7 to 11, Sheet 2, I show a controlling device D' which comprises a yoke or saddle 21 adapted to straddle a main spring A' and also a series of friction plates or leaves d—d' superposed upon a controlling leaf 22 having a loop or eye 23 connected to the shackle bolt 24 for the main leaf 25 of the vehicle spring. The friction plates or leaves $d$—$d'$ are formed with registering rivet openings and slots at spaced intervals, whereby three plates $d$ are immovably fixed by a bolt or rivet 26 to controlling leaf 22, and the intervening plates $d'$ are rigidly secured by another bolt or rivet 27 to separate strips or pieces 28 having a U-shaped part 29 riveted thereto and confined loosely within the flanged cross portion of the yoke or saddle, see Figs. 9 and 10. Compression springs 30 are also interposed between the cross portion of the yoke or saddle and part 29, which springs apply pressure and tension to friction plates $d$—$d'$ and a few leaves of the main spring, especially when the hexagonally-shaped eccentric 31 upon the connecting bolt 32 for the side walls of the yoke or saddle is rotatably adjusted to press tightly against bottom leaf 33 of the main spring. Accordingly, this form of the invention will function in substantially the same way as the device shown in Figs. 1 to 6, inasmuch as the friction plates $d$ are connected to the controlling leaf 22 of the top leaf of the main spring, and the plates $d'$ are coupled or yoked to one of the remote sub-leaves (leaf 33) of the main spring. That is to say, when the main spring is flexed, either upwardly or downwardly, the supplemental leaves $d$—$d'$ are shifted a substantial distance in respect to each other under a clamping pressure which produces sufficient friction to control and govern the movements of the main spring.

In Fig. 11 I show a controlling device $D^2$ corresponding to the one shown in Figs. 1 to 6, but instead of connecting yoke member 9 to one of the lower leaves of the main spring this yoke member is connected by a link 34 to one of the members 35 of the clip assembly for axle C. Leaf 2 in this case is also anchored or affixed to the axle by the clip assembly, and its outer end is bent upwardly and reverted and attached to a number of the supplemental leaves in the same way as shown in Figs. 1 to 6. The supplemental leaves are preferably all of the same length and thinner than the leaves of the main spring, and they extend closely to the shackle connections for the main spring. Being so arranged and superposed upon each other, and also clamped against the top leaf of the main spring, these supplemental leaves are caused to creep upon each other with marked effect in the flexing movements of the main spring to prevent snappy rebound or an objectionable reflex action.

In Fig. 12, the controlling device $D^3$ is in all respects the same as device D in Figs. 1 to 6, excepting that the thin supplemental leaves are longer, and that a link 36 is employed to connect yoke 9 to the clamping plate 37 of the clip assembly for axle C. The supplemental leaves are preferably of about the same or equal length, and the main spring may be made of slightly thinner leaves or a less number of leaves for a given load than as customarily practiced inasmuch as the supplemental leaves re-enforce or enhance the strength of the main spring. To eliminate friction between the leaves of the main spring, each leaf may be crowned or channeled so that only linear contact relations are established between superposed leaves, but this is done only in the main spring. The supplemental leaves are preferably flat and engage each other throughout their flat areas to obtain maximum frictional results, and are much thinner than the leaves of the main spring so as to flex more easily.

What I claim, is:

1. A controlling device for a laminated main spring, including a set of supplemental leaves for the main spring, means for compressing said leaves and a plural number of the leaves of the main spring together, and coupling means connecting a series of said supplemental leaves to one of the short laminations of said laminations of said main spring, for shifting said supplemental leaves upon each other during flexing movements of the main spring.

2. A controlling device for a laminated vehicle spring mounted upon an axle, including a series of supplemental leaves for the vehicle spring, means for compressing said leaves together, and a coupling means engaged with said supplemental leaves and connected with said device and the spring where connected to the vehicle, whereby relative movement is produced between the supplemental leaves in flexing said vehicle spring.

3. A controlling device for a laminated vehicle spring, including a series of superposed leaves under compression, means connecting one of said leaves to one of the short laminations of the vehicle spring, and anchoring means for another of said leaves to produce relative movement between the series of superposed leaves when the vehicle spring is flexed.

4. A controlling device for a laminated main spring, including a plurality of supplemental leaves clamped to said spring, an anchoring connection for several of said leaves, and means connecting other of said leaves to one of the short laminations of the springs.

5. A controlling device for a laminated main spring, including a yoke connected to one of the laminations, a series of supplemental leaves connected with said yoke, a series of supplemental leaves connected to a part fixed to the vehicle, and means for clamping said leaves frictionally together.

6. A controlling device for a laminated main spring, including a set of thin interengaging elements, means for clamping said elements to the spring, and a coupling member for connecting certain of said interengaging elements to the main spring for producing augmented relative movement between the interengaging elements compared with the creeping movement produced between the laminations of the main spring, when said spring is flexed.

7. A controlling device for a vehicle spring having leaves of different length, including a series of supplemental leaves connected to one of the shorter spring leaves, and a series of co-acting supplemental leaves coupled to one of the longer spring leaves.

8. A controlling device for a laminated vehicle spring, including a series of supplemental leaves, a yoke embracing said supplemental leaves, means connecting said yoke to one of the leaves of the spring and to a plural number of supplemental leaves, means connecting other supplemental leaves to the spring where connected to the vehicle to effect relative movement between the supplemental leaves upon flexure of the spring, and adjustable means for producing tension between said supplemental leaves.

9. A controlling device for a laminated vehicle spring, including a series of interposed leaves superposed upon the vehicle spring, an adjustable clamping device for producing frictional tension between said leaves, and means coupling different sets of said leaves to different laminations of said vehicle spring whereby longitudinal movements is imparted relatively between said leaves when flexure takes place in the loaded spring.

10. A controlling device for a laminated vehicle spring, including a series of supplemental leaves, means connecting a series of said supplemental leaves to a leaf of the spring, a controlling leaf anchored relatively to the top leaf of the spring and connected to another series of said supplemental leaves, and means for compressing said supplemental leaves together.

11. A controlling device for a graduated leaf spring, including a series of friction elements superposed upon the main leaf of said spring, adjustable means for clamping said friction elements together, and means for anchoring different sets of said friction elements lying in different planes to produce relative movement between said elements when said spring is flexed.

12. A controlling device for a graduated leaf spring, including a series of thin spring leaves of substantially equal length superposed upon the main leaf of said graduated leaf spring, adjustable clamping means for producing frictional tension between said thin leaves, and means for producing relative movement between said thin leaves when said graduated leaf spring is flexed.

13. The combination of a vehicle having a spring embodying leaves of graduated length, with separate sets of frictionally engaged elements having independent connection with different portions of said spring to produce relative movement between said elements when said spring is flexed.

14. The combination of a vehicle having a laminated main spring, with a series of supplemental leaves of substantially equal length and thinner than the leaves of said main spring, and superposed thereon, means for producing frictional tension between said leaves, and means for connecting said supplemental leaves to the spring where connected to the vehicle and to other parts of the main spring whereby relative movement of said leaves will be produced upon flexing the main spring either upwardly or downwardly.

In testimony whereof I hereby affix my signature.

GEORGE W. CRABTREE.